Figure 1B:
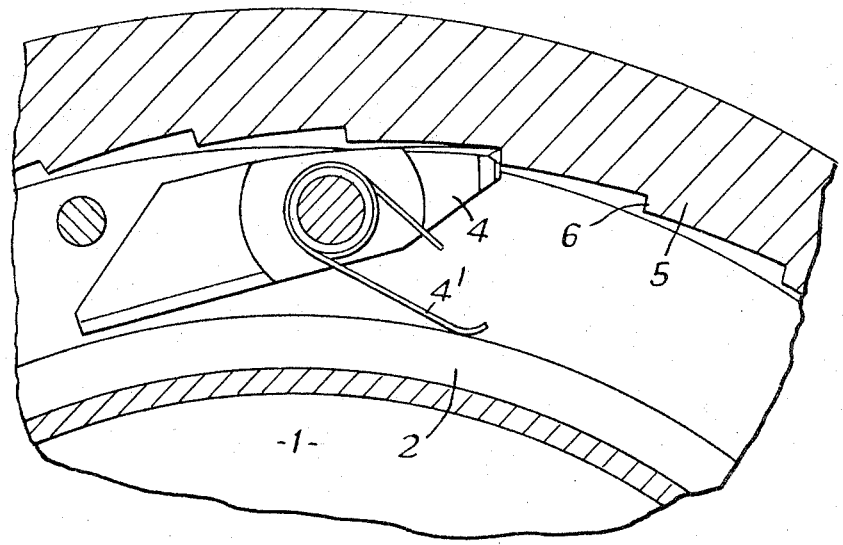

Oct. 18, 1966     H. A. CLEMENTS ET AL     3,279,273
SYNCHRONOUS SELF-SHIFTING CLUTCH MECHANISMS
Filed Oct. 13, 1964     3 Sheets-Sheet 1
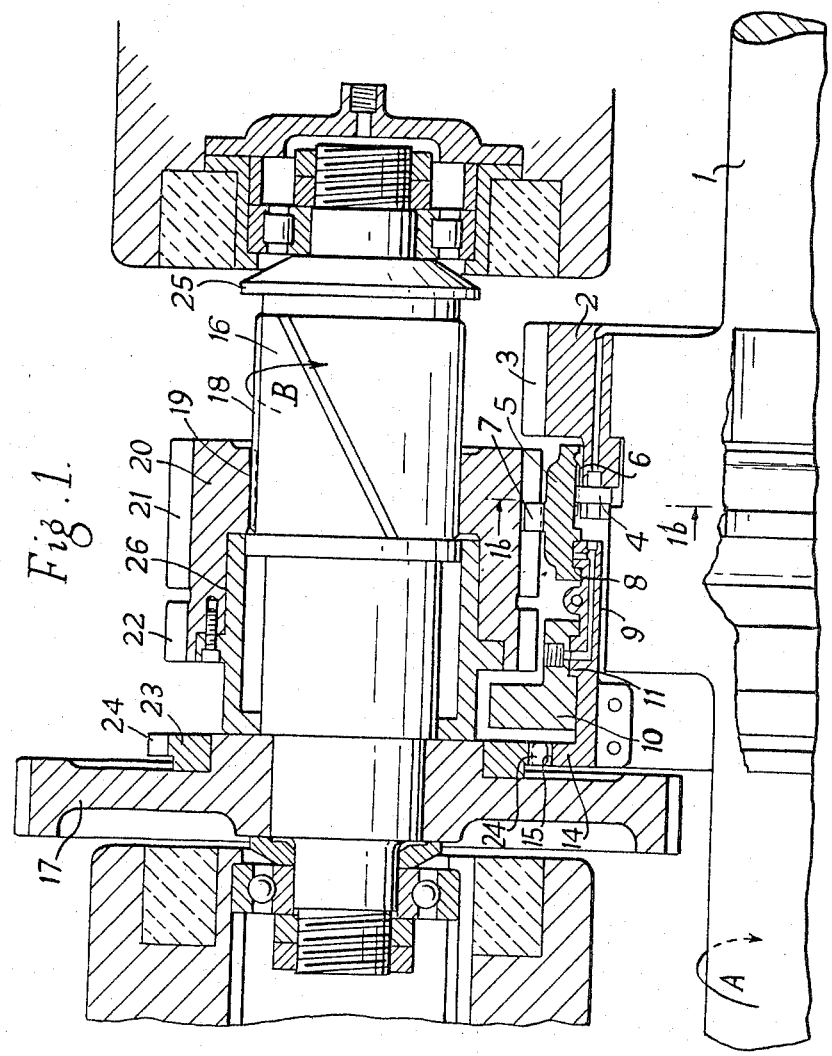
INVENTORS
HERBERT ARTHUR CLEMENTS
ROBERT HOWARD HEYBOURNE
BY
Benjamin Sweedler
ATTORNEY United States Patent Office 3,279,273
Patented Oct. 18, 1966

3,279,273
SYNCHRONOUS SELF-SHIFTING CLUTCH
MECHANISMS
Herbert Arthur Clements, Weybridge, Surrey, and Robert Howard Heybourne, Thames Ditton, Surrey, England, assignors to S. S. S. Patents Limited, London, England
Filed Oct. 13, 1964, Ser. No. 403,525
Claims priority, application, Great Britain, Oct. 14, 1963, 40,479/63; Dec. 16, 1963, 49,644/63
6 Claims. (Cl. 74—339)

This invention relates to synchronous self-shifting clutch mechanisms for drivably engaging and disengaging rotary clutch members.

A well known type of synchronous self-shifting clutch mechanism comprises a first rotary clutch member provided with a first set of clutch teeth, a second rotary clutch member, an intermediate member provided with a second set of clutch teeth and constrained for helical movement relative to the second clutch member to bring the second set of clutch teeth into and out of engagement with the first set of clutch teeth, and pawl and ratchet mechanism for initiating precise interengagement of the sets of clutch teeth upon relative angular movement in one direction between the first and second clutch members. During the movement of the clutch towards engagement there is relative axial sliding movement between the actuating pawls and the coacting ratchet teeth, and following the initiation of clutch engagement the pawls and ratchet teeth disengage axially, thereby becoming relieved of the actuating load.

An object of the invention is to provide a clutch of the above type wherein there is substantially no relative axial sliding movement between the pawls and ratchet teeth arising from the engagement of the clutch.

Another object of the invention is to provide a clutch of the above type wherein the first and second clutch members are on parallel axes of rotation, whereas heretofore such clutches have only been suitable for a coaxial arrangement of the first and second clutch members.

In accordance with the invention there is provided a synchronous self-shifting clutch mechanism for interengaging first and second sets of clutch teeth, the mechanism comprising a first rotary clutch member provided with said first set of clutch teeth, a second rotary clutch member, an intermediate member constrained for helical movement relative to said second clutch member to bring said second set of clutch teeth into and out of engagement with said first set of clutch teeth, pawl and ratchet mechanism for actuating the intermediate member to initiate precise interengagement of the said sets of clutch teeth, and a rotary actuating ring axially located relative to one of said first clutch and intermediate members and having a toothed driving connection with the other of said members, said pawl and ratchet mechanism being arranged between said actuating ring and said one member whereby upon movement of said intermediate member to interengage at least partially said sets of clutch teeth the pawls are relieved of the actuating load by the axial disengagement of the teeth of said driving connection without the need for relative axial disengaging movement between the pawls and the ratchet teeth.

In a preferred embodiment a driving connection is provided between the second rotary member and a rotatable support member by which the actuating ring is carried, whereby with rotation of the second rotary member and hence rotation of the actuating ring, the support member is rotated in the same direction as and at an angular speed not less than that of the actuating ring.

Figure 2:
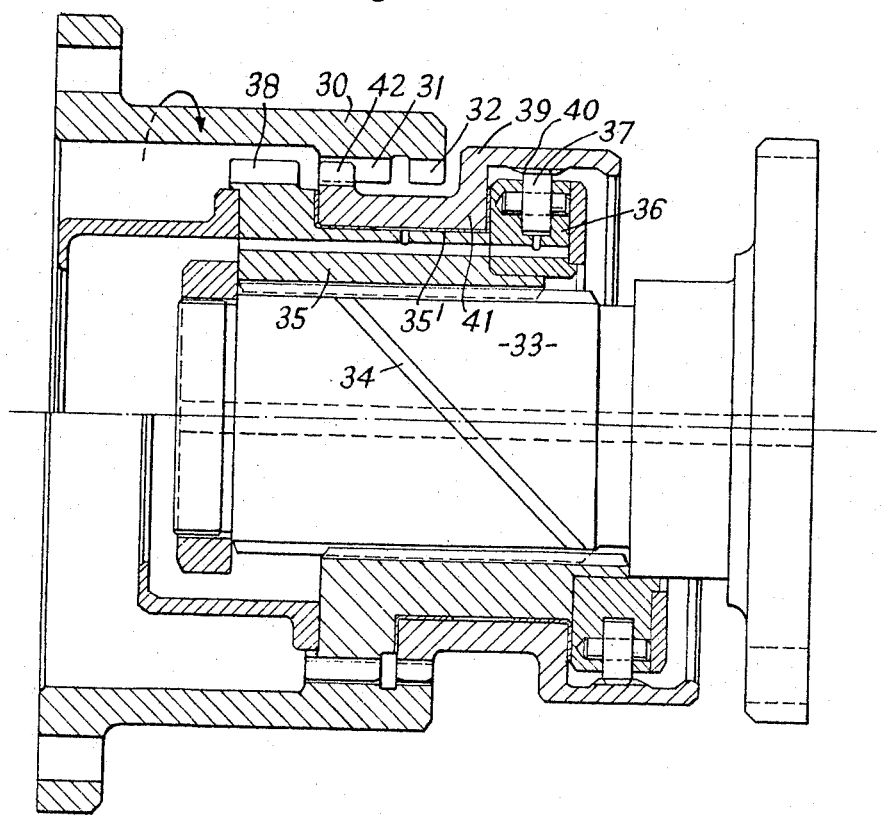

Embodiments of the invention will now be described by way of example with reference to the accompanying drawings, in which:

FIG. 1 is a view in longitudinal section of clutch mechanism according to the invention wherein the first and second clutch members have parallel axes of rotation, and applied to the establishment and interruption of drive from a barring motor through toothed gearing to a turbine shaft, FIG. 1a is a development view of main and auxiliary clutch teeth of the clutch mechanism of FIG. 1, FIG. 1b is a part detail view, on a larger scale than FIG. 1, on the line 1b—1b of FIG. 1, and FIG. 2 is a view in longitudinal section of clutch mechanism according to the invention wherein the first and second clutch members are mounted coaxially, the clutch being shown disengaged in the upper half of the figure and engaged in the lower half.

Referring to FIG. 1, a turbine shaft 1 carries a ring 2 which forms the above-mentioned first rotary member, the ring 2 being formed with a first set of clutch teeth constituted by external gear teeth 3 and carrying a plurality of pawls one of which is shown at 4. The noses of the pawls 4 project radially outwardly from the axis of the turbine shaft 1, and point in clockwise direction as viewed from the left hand end of the mechanism, the pawls 4 being provided with control springs 4' tending to urge the noses of the pawls radially outwardly. Around the turbine shaft 1 is arranged an actuating ring 5 formed with internal ratchet teeth 6, adapted to coact with the pawls 4, as shown in part end view in FIG. 1b, and with a ring of external gear teeth 7. The actuating ring 5 is mounted via a plain white metalled bearing on an external annular flange 8 on one end of an annular support member 9, surrounding the turbine shaft 1, the flange 8 projecting into an internal annular groove in the actuating ring 5. The support member 9 is journalled on a static ring 10, via a white metalled bearing comprising an extrenal annular flange 11 formed on the support member and projecting into an internal annular groove in the static ring 10, which is bolted to a stationary casing (not shown), that encloses the clutch mechanism. The support member 9 has a radially outwardly projecting annular flange 14 formed with a ring of external gear teeth 15.

An auxiliary shaft 16, forming the above-mentioned second rotary member, is journalled with its axis parallel to that of the turbine shaft 1, and is drivably connected to a conventional high speed barring motor (not shown) through spur reduction gearing including a gear wheel 17. The shaft 16 is formed with external left hand helical splines 18 with which are engaged internal helical splines 19 in an intermediate member formed by a clutch sleeve 20 mounted on shaft 16, the clutch sleeve 20 being formed with a second set of clutch teeth constituted by a ring of main gear teeth 21 of normal circumferential thickness, the clutch sleeve 20 also being formed with a ring of auxiliary gear teeth 22 which are of smaller circumferential thickness than the main gear teeth 21 and are each aligned, in respect of one side, with a main gear tooth 21, as shown in the development view, FIG 1a. To the gear wheel 17 is bolted a ring 23 formed with external gear teeth 24 on a larger pitch circle diameter than the gear teeth 21 and 22, the gear teeth 24 engaging with the gear teeth 15 on the support member 9.

The operation is as follows.

With the turbine shaft 1 rotating at high speed in the direction of the arrow A the barring motor is normally switched off, hence the auxiliary shaft 16, the clutch sleeve 20, the actuating ring 5 and its support member 9 are stationary. Under these conditions the clutch sleeve 20 is out of toothed engagement with ring 2 on the turbine shaft 1, being in the position shown in the drawing, and the gear teeth 7 on the actuating ring 5 are in mesh, as shown, with the main gear teeth 21 on the clutch sleeve 20. The pawls 4 move at high speed relative to the ratchet teeth 6, and since the pawls 4 are made tail heavy relative to their pins their noses are retracted by centrifugal force out of contact with the ratchet teeth 6. Below a predetermined angular speed of the turbine shaft 1, viz a relatively low speed as compared with the full turbine speed, the centrifugal force acting to retract the noses of the pawls 4 from the ratchet teeth 6 is overcome by the action of the pawl control springs, whereby to bring the pawls into over-running contact with the ratchet teeth 6 at the low speed of the shaft 1.

When the turbine set is to be stopped, the barring motor is switched on while the speed of the turbine is decreasing shortly after the motive power of the turbine has been cut off, and the barring motor, acting through the reduction gearing, rotates the shaft 16 and toothed ring 23 slowly in the direction of the arrow B, the toothed actuating ring 5 being driven slowly in the direction of arrow A by the interaction of the gear teeth 7 and 21, and the support member 9 also being driven slowly in the direction of arrow A, but at a slightly higher speed than the actuating ring 5, by the interaction of the gear teeth 15 and 24. At the above-mentioned relatively low angular speed of the turbine shaft 1 the control springs of the pawls 4 overcome the action of centrifugal force and urge the noses of the pawls into ratcheting engagement with the ratchet teeth 6. When the speed of the turbine shaft 1 falls fractionally below that of the actuating ring 5, pawls 4 engage ratchet teeth 6, thereby creating a reactive force that causes the clutch sleeve 20 to shift helically along the auxiliary shaft 16 to bring its main gear teeth 21 into precise initial interengagement with the gear teeth 3. The coaction of the gear teeth 21 and 3 then causes the clutch sleeve 20 to move axially into full geared engagement with the gear teeth 3, the clutch sleeve 20 then being against a stop 25. A geared driving connection is thereby established between the barring motor and the turbine shaft 1, via the reduction gear wheel 17, auxiliary shaft 16, and gear teeth 21 and 3, so that the turbine shaft is rotated at a substantially constant low speed determined by the speed of the barring motor and the ratio of the reduction gear train comprising the gear wheels 17, 21 and 3.

During the movement of the clutch sleeve 20 from initial to full interengagement of the main gear teeth 21 and gear teeth 3 the main gear teeth 21 move axially out of engagement with the gear teeth 7 on the actuating ring 5, thereby relieving the pawls 4 from the actuating force, and the auxiliary gear teeth 23 enter into mesh with the gear teeth 7; hence the actuating ring 5 continues to be rotated.

Since the actuating ring 5 carrying the ratchet teeth 6 is axially located at 8 relative to the first clutch member 1 carrying the pawls 4, movement of the clutch from the disengaged condition to the engaged condition does not cause any relative axial movement of the pawls 4 and ratchet teeth 6.

When the turbine shaft is again accelerated, the interaction of the main gear teeth 21 and gear teeth 3 shifts the clutch sleeve 20 helically along the auxiliary shaft 16 out of geared engagement with the turbine shaft 1, and the main gear teeth 21 again interengage with the gear teeth 7 on the actuating ring 5, being chamfered as shown in FIG. 1a to effect a smooth transition from the narrow teeth 22 to the main teeth 21. Thereupon, the torque due to friction at the bearing at 8 between the rotating actuating ring 5 and its faster rotating support member 9, acting in conjunction with the helical splines 18 and 19, causes the actuating ring 5 to shift the clutch sleeve 20 axially back to the position shown in FIG. 1, in which a sleeve 26 bolted to the clutch sleeve 20 is against the side of the gear wheel 17, and in which the pawls 4 ratchet relative to the ratchet teeth 6 until the turbine shaft attains the said predetermined speed, whereupon the noses of the pawls are disengaged from the ratchet teeth by centrifugal force. The barring motor is switched off at any convenient time after the turbine power has been restored.

If desired, the support member 9 on which the actuating ring 5 is journalled, may, instead of being geared to the barring motor for rotation by it, be fixed to a stationary support. The arrangement above described is preferred, however, since with a fixed support member for the actuating ring 5, upon the barring motor being switched on the friction at the bearing at 8 between the actuating ring 5 and its support member 9 could exert on the actuating ring 5 a reaction torque that could cause the clutch sleeve 20 to move into nuzzling end to end contact of its teeth 21 with the teeth 3 on the ring 2, before the speed of the turbine shaft 1 has fallen to a value such that the pawls 4 and ratchet teeth 6 can interact to bring about precise initial interengagement of the gear teeth 21 and 3. It is therefore preferred that the support member 9 be arranged to be rotated in the same direction as the actuating ring 5 by the barring motor, at an angular speed not less than that of the actuating ring 5. The angular speeds of the support member 9 and actuating ring 5 may be arranged to be the same, by arranging the gear teeth 24 on the same pitch circle diameter as the gear teeth 21, in which case there will be no tendency for the clutch sleeve 20 to shift into nuzzling contact as described above. Where the support member 9 is arranged to be driven at a slightly higher speed than the actuating ring 5, as described, the torque applied to the actuating ring 5 due to friction at its bearing at 8 is in the sense to restrain the clutch sleeve 20 from shifting into nuzzling toothed contact.

In FIG. 2, the first clutch member comprises a sleeve 30 formed with a first set of clutch teeth 31, of normal thickness, and narrower auxiliary teeth 32 each in line on one side with a tooth 31, as indicated in FIG. 1a. The second clutch member is formed by a shaft 33, formed with right handed external helical splines 34 with which are engaged internal helical splines in an intermediate member 35 which carries a ring 36 in which are located pawls 37 the noses of which point in anti-clockwise direction as viewed from the left hand end of the clutch as seen in FIG. 2. The intermediate member 35 is formed with a second set of clutch teeth 38, and carries an actuating ring 39 which is formed with internal ratchet teeth 40 adapted to cooperate with the pawls 37, the actuating ring 39 being journalled in the intermediate member 35 via a white metal bearing 35' comprising an internal annular flange 41 projecting into an annular groove in the intermediate member 35. The actuating ring 39 is formed with external gear teeth 42 which with the clutch disengaged are in mesh with the teeth 31 as shown in the upper half of FIG. 2.

In operation, so long as the second clutch member 34 is rotating in the direction of the arrow faster than the first clutch member 30, the pawls 36 ratchet relative to the ratchet teeth 40, and the friction at the bearing 35' between the actuating ring 39 and intermediate member 35 together with the action of the helical splines maintains the intermediate member 35 in the left hand position shown in the upper half of FIG. 2, when the first clutch member 30 tends to over-run the second clutch member 33 in the direction of the arrow, pawls 37 are engaged by ratchet teeth 40 and the intermediate member 35 is shifted helically relative to the shaft 33 to bring the second set of clutch teeth 38 axially into precise initial interengagement with the first set of clutch teeth 31, the engagement of the clutch being completed by the interaction of the clutch teeth 31 and 38, to bring the clutch parts to the positions shown in the lower half of FIG. 2. During the movement of the intermediate member 35 from the left hand position to the right hand position, the teeth 42 slide axially relative to the first clutch teeth 31, and then move out of mesh with the teeth 31 and into mesh with the narrow auxiliary teeth 32. Since the actuating ring 39 is axially located relative to the intermediate member 35 the said movement of the intermediate member 35 does not involve relative axial movement of the pawls 37 and ratchet teeth 40.

What is claimed is:

1. Synchronous self-shifting mechanism for inter-engaging first and second sets of load transmitting teeth, the mechanism comprising a first rotary member provided with said first set of teeth, a second rotary member, an intermediate member constrained for helical movement relative to said second member to bring said second set of teeth into and out of engagement with said first set of teeth, pawl-and-ratchet mechanism comprising pawls and ratchet teeth for actuating said intermediate member to initiate precise interengagement of the said first and second sets of teeth, a rotary actuating ring, means locating said ring axially relative to one of said first and intermediate members, a toothed driving connection between said ring and the other of said members, said pawl-and-ratchet mechanism being arranged between said actuating ring and said one rotary member whereby, upon movement of said intermediate member to interengage at least partially said sets of teeth, the pawls are relieved of the actuating load by the axial disengagement of the teeth of said driving connection without the occurrence of relative axial disengaging movement between said pawls and said ratchet teeth.

2. Synchronous self-shifting mechanism according to claim 1, including means journalling said first and second members for rotation about parallel axes, said actuating ring being arranged coaxially with the first rotary member, and said toothed driving connection comprising external gear teeth on said intermediate member engaged with external gear teeth on said actuating ring.

3. Synchronous self-shifting mechanism according to claim 1, including a support member, means journalling said actuating ring on said support member, and means drivably connecting said support member to said second rotary member to rotate said support member in the same direction as and faster than said actuating ring when said second rotary member rotates.

4. Synchronous self-shifting clutch mechanism according to claim 1, including a support member, means journalling said actuating ring on said support member and means drivably connecting said support member to said second rotary member to rotate said support member in the same direction as and at the same speed as said actuating ring when said second rotary member rotates.

5. Synchronous self-shifting clutch mechanism according to claim 1, including a fixed support member, and means journalling said actuating ring journalled on said support member.

6. A turbine set comprising a turbine having an output shaft, a motor driven slow turning gear associated with said output shaft and mechanism according to claim 1, means drivably connecting said first rotary member to said turbine output shaft, and means drivably connecting said second rotary member to said motor driven slow turning gear.

References Cited by the Examiner
UNITED STATES PATENTS

| | | | |
|---|---|---|---|
| 2,770,979 | 11/1956 | Sinclair | 74—339 |
| 2,907,431 | 10/1959 | Sinclair | 192—67 |
| 2,972,397 | 2/1961 | Sinclair | 192—67 |

DAVID J. WILLIAMOWSKY, *Primary Examiner.*

A. T. McKEON, *Assistant Examiner.*